United States Patent [19]

Siegrist

[11] Patent Number: 4,869,057
[45] Date of Patent: Sep. 26, 1989

[54] MOWER DECK HEIGHT AND ANGLE CONTROL

[75] Inventor: Rudolf Siegrist, Valley City, Ohio
[73] Assignee: MTD Products Inc., Cleveland, Ohio
[21] Appl. No.: 54,232
[22] Filed: May 26, 1987
[51] Int. Cl.⁴ .............................................. A01D 34/66
[52] U.S. Cl. ...................................... 56/15.9; 56/15.8; 56/DIG. 22
[58] Field of Search ...................... 56/16.2, 15.8, 15.9, 56/DIG. 22, 208

[56] References Cited

U.S. PATENT DOCUMENTS

| | | | |
|---|---|---|---|
| 2,945,338 | 7/1960 | Burrow et al. | 56/DIG. 22 |
| 3,107,472 | 10/1963 | Witt et al. | 56/DIG. 22 |
| 3,283,486 | 11/1966 | Mariek et al. | 56/DIG. 22 |
| 3,874,150 | 6/1973 | Boeck | 56/15.9 |
| 4,206,584 | 6/1980 | Johnson et al | 56/15.8 |
| 4,313,295 | 3/1982 | Hansen et al. | 56/DIG. 22 |
| 4,416,109 | 11/1983 | Slazas | 56/15.8 |
| 4,441,306 | 4/1984 | Kuhn | 56/15.9 |
| 4,490,966 | 1/1985 | Kuhn et al. | 56/15.9 |
| 4,577,455 | 3/1986 | Amano et al. | 56/DIG. 22 |
| 4,760,687 | 8/1988 | Siegrist | 56/DIG. 22 |

*Primary Examiner*—Paul J. Hirsch
*Attorney, Agent, or Firm*—Woodling, Krost & Rust

[57] ABSTRACT

A mower deck height and angle adjustment means is disclosed which utilizes adjustment to the length of a bolt extending between a mower deck suspension mechanism part and an in-line located flange to vary the relationship between the mower deck and the mower frame.

3 Claims, 4 Drawing Sheets

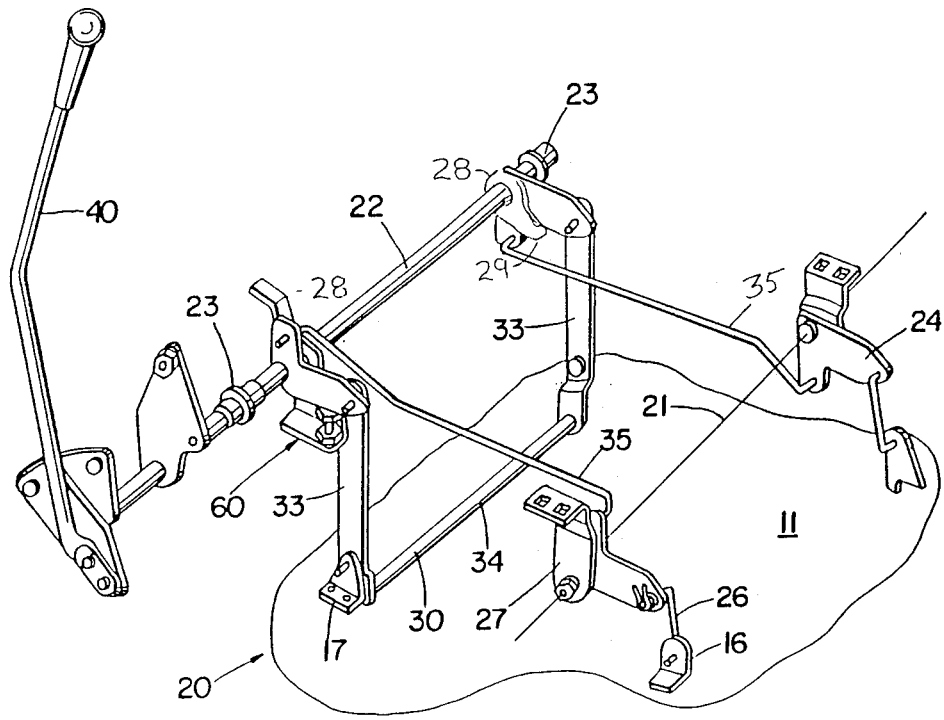
Fig. 2
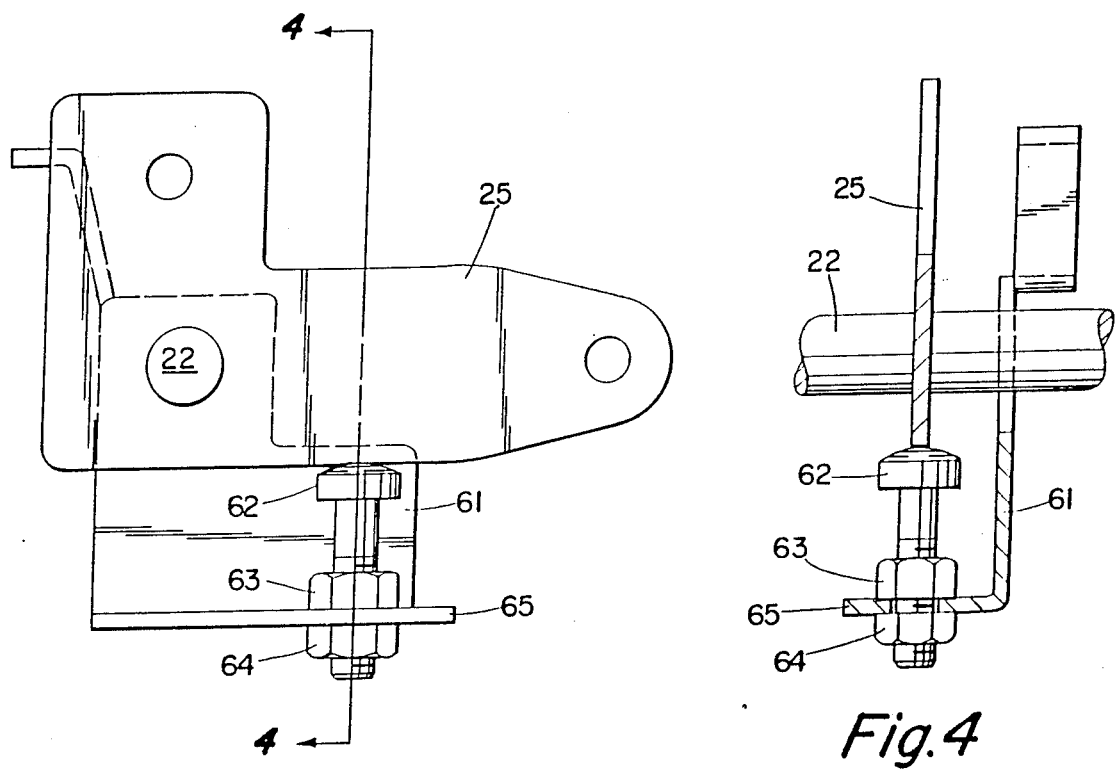
Fig. 3
Fig. 4

MOWER DECK HEIGHT AND ANGLE CONTROL

FIELD OF THE INVENTION

This invention relates to a mechanism for adjusting the angular relationship between a rotary shaft and a mower deck lift member.

BACKGROUND OF THE INVENTION

Riding lawn mowers and tractors are popular due to their reduction of the magnitude of lawn maintenance work. One continuing objection to such machines, however, is the unevenness of their cutting. This unevenness is due, in no small part, to the difficulty in orienting the mowing deck parallel to the ground. This difficulty arises both during the initial manufacture of the machines and then subsequently as the machine loses its initial orientation due to operating stresses, age, etc. Frequently, a machine that once has an even cut loses it later in its service life.

This present invention is directed towards providing a mechanism for adjusting the orientation of a mowing deck.

SUMMARY OF THE INVENTION

This present invention is directed towards providing a mechanism for adjusting the orientation of a mowing deck in respect to the ground.

It is an object of this invention to improve the evenness of the cut of the mower.

It is an object of this invention to facilitate the manufacture of mowers.

It is an object of this invention to increase the service life of mowers.

Other objects and a more complete understanding of the invention may be had by referring to the following specification and drawings in which:

DESCRIPTION OF THE DRAWINGS

FIG. 2 is a perspective view of the entire mower control of FIG. 1 and

FIG. 3 is a side view of the angular adjustment mechanism of FIG. 1.

FIG. 4 is a end view of the mechanism of FIG. 2,

DESCRIPTION OF THE PREFERRED EMBODIMENT

Figure 6:
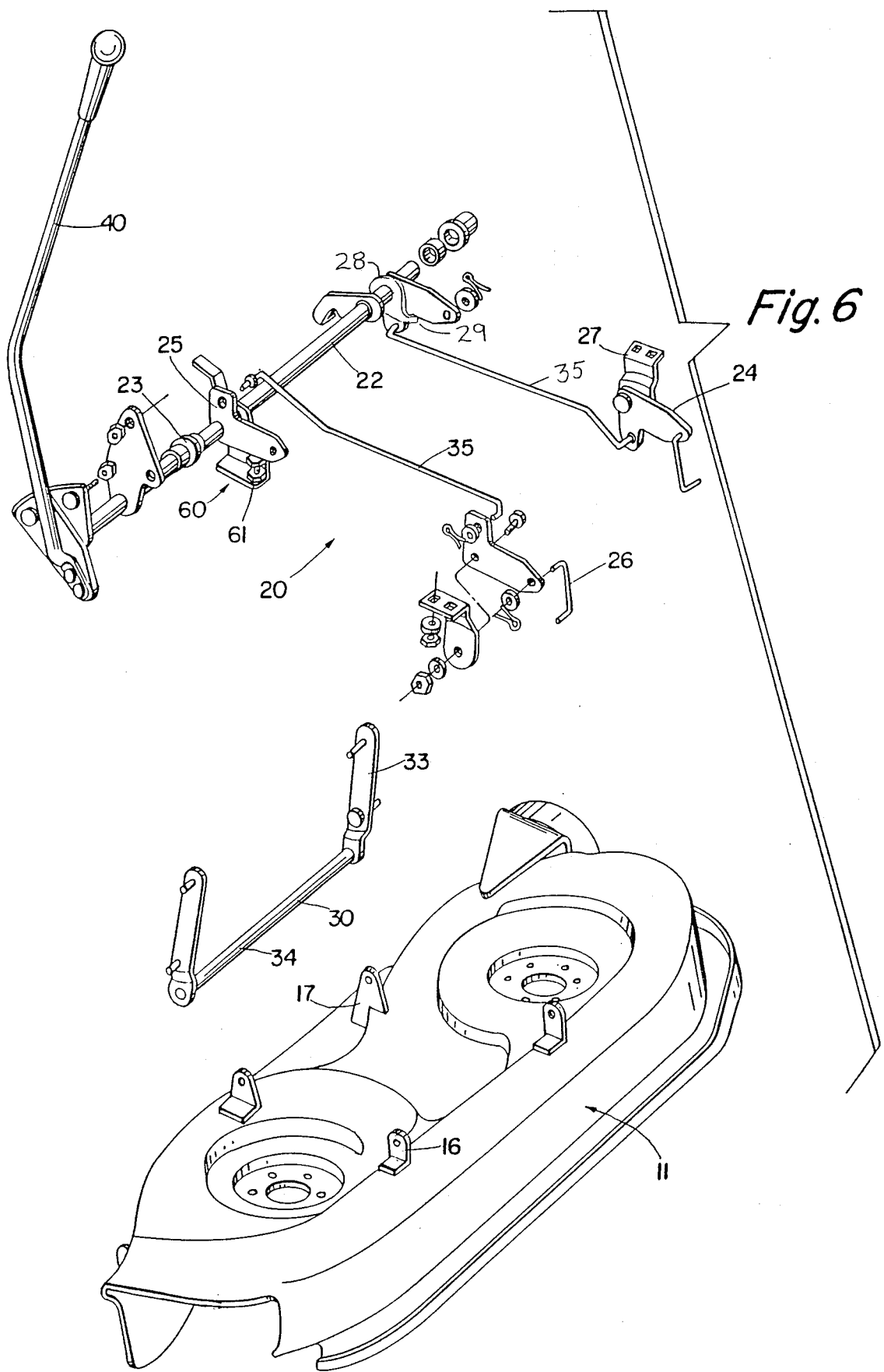
FIG. 6 is a separated perspective view of the mower control of FIG. 2.

This invention relates to an improved adjustment mechanism for mower decks. The invention will be described in the environment of a lawn tractor having a separate, two blade mower deck 11 driven by a belt (FIGS. 2 and 6).

The lawn tractor has a frame supported by four wheels for passage a fixed distance over the lawn. An engine is mounted to the top of this frame with a driven shaft extending perpendicular to the ground. The mower deck 11 is mounted to the bottom of the frame between the pairs of wheels with a mower blade drive pulley extending upwards perpendicular to the ground.

The mower deck 11 is mounted to the frame utilizing a height adjustment mechanism 20.

The height adjustment mechanism has a shaft 22 rotatively mounted to the frame via two hangers 23. The shaft 22 in turn has two "L" shaped deck lift float brackets 25 rotatively mounted thereon. Two subsidiary brackets 28 are welded to the shaft 22 with small tabs 29 underlying the "L" shaped deck lift float brackets 25 to rotatively connect the float brackets 25 to the shaft 22 in a lot-motion type connection. The weight of the mower deck 11 biases the float brackets 25 into normal contact with the subsidiary brackets 28. Two other "L" shaped deck lift float brackets 24 are directly pivotally connected to the frame about a single axis 21 via brackets 27. One end of each "L" shaped float bracket 24 on the front axis 21 is connected via lift links 26 to a mounting tab 16 on the mower deck 11. These lift links 26 are independent of each other so as to allow the mower deck 11 to move differentially in respect to the front axis 21. One end of the "L" shaped float brackets 25 on the rear shaft 22 are connected via the lift arms 33 of a stabilizer 30 to two additional mounting brackets 17 on the mower deck 11. The two lift arms 33 of the stabilizer 30 are connected together for substantial common rotation via a torque rod 34. The other arms of the "L" shaped float brackets 25 on the rear shaft 22 are connected to the other arms of the "L" shaped float brackets 24 on the front axis 21 via two equal length connecting rods 35. Due to the orientation of these shafts, brackets, rods and lift arms/links, any rotation about either the front axis 21 or rear shaft 22 will be transformed into an upwards or downwards motion of the mower deck 11 parallel to the ground. This controls the cutting height of the deck 11. In the embodiment shown, the rotation of the float brackets 24, 25 is controlled by a lift handle 40 connected to the rear shaft 22. This lift handle 40 can be selectively moved and fastened in any angular position so as to accurately control the height of the mower deck 11. A lift handle helper spring (not shown) eases the movement of the deck. Due to the indirect subsidiary bracket 28 connection between the shaft 22 and the "L" shaped lift brackets 25, the mower deck 11 is free to move upwards of the position otherwise set by the lift handle should some force move the mower deck 11 upwards against the weight of such deck 11. This allows the mower deck to better track the ground reducing scraping (for example, when the tractor wheels bridge a high ridge on the lawn) as well as retracting under stress without physical damage to any links, rods or brackets (for example, when the mower deck 11 hits a rock).

In a typical deck the lift brackets are all fixedly welded onto two parallel shafts during manufacture. This effectively locks the mower deck 11 into a single set orientation in respect to the ground. If this orientation is wrong, or later becomes wrong, the lawn mower will cut unevenly. The invention of this application is an adjustment mechanism 60 that allows one to vary the orientation of the deck at any time.

Figure 1:
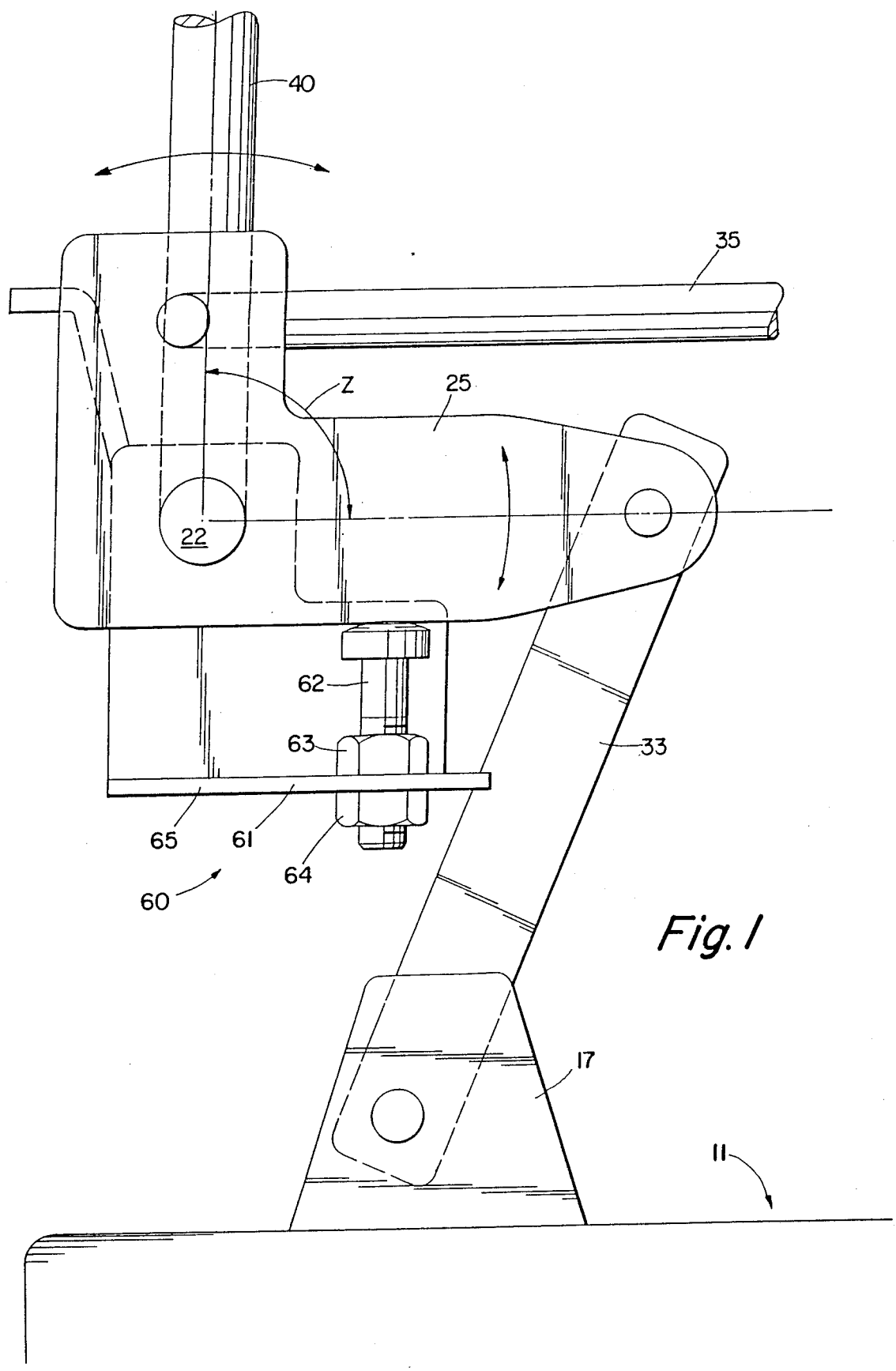
FIG. 1 is an enlarged side view of typical mower height control incorporating a mower deck orientation adjustment mechanism.

The adjustment mechanism 60 supplements a subsidiary bracket 28 with an adjustment feature including an adjustment bracket 61, a hex bolt 62 and two locking nuts 63, 64 (FIG. 1). The adjustment bracket 61 is welded onto the lift shaft 22 a spaced distance from the lift bracket 25 with a flange 65 of the adjustment bracket 61 extending underneath such bracket 25. The hex bolt 62 extends through a hole in the flange 65 of the adjustment bracket 61 to contact the underside of the lift bracket 25. The two locking nuts 63, 64 are threaded onto the bolt 62 on either side of the flange 65.

Figure 5A:
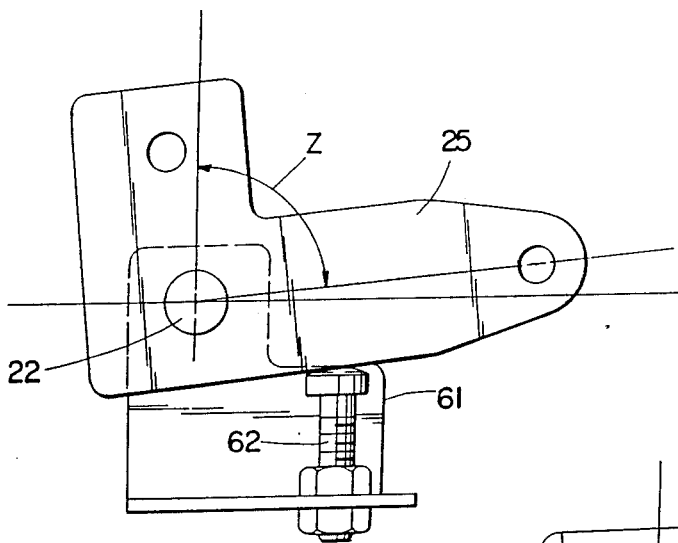
FIG. 5 is a series of side views of the angular adjustment mechanism of FIG. 2 showing a few of the angular positions possible in such mechanism.
Figure 5B:
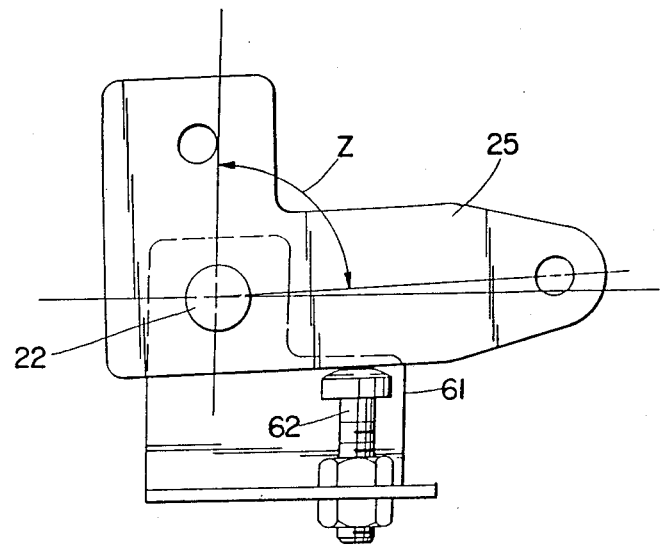
Figure 5C:
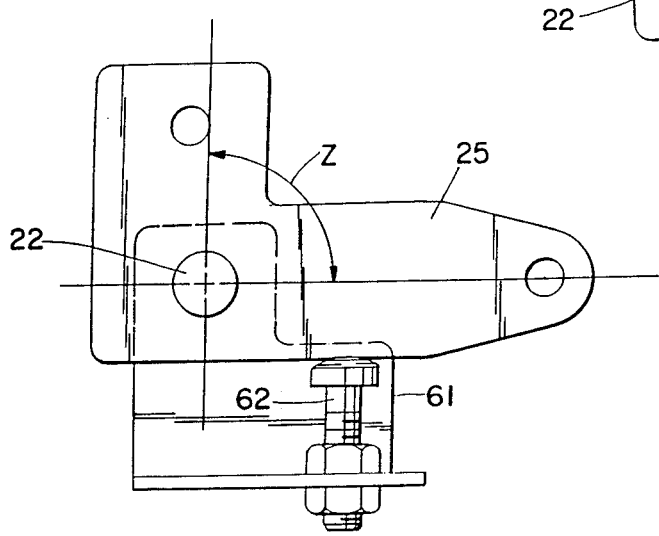
Figure 5D:
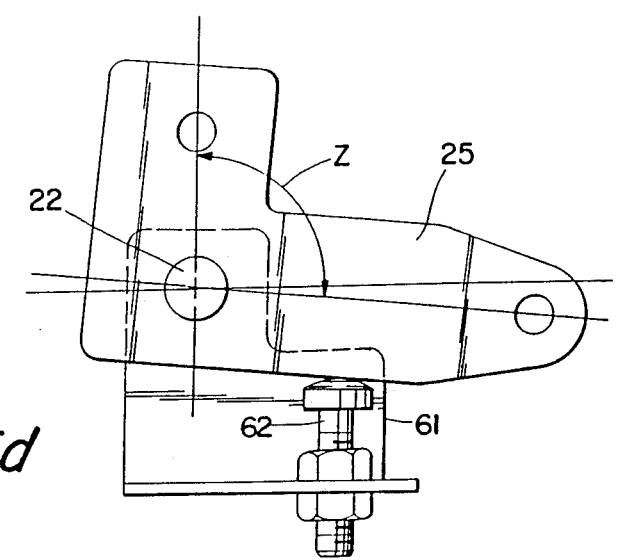

The lift bracket 25 is itself free to rotate about the lift shaft 22. Due to the fact that the bolt 62 is located under the lift brackets intermediate the lift shaft 22 and the stabilizer 30, the downward force of the weight of the mower deck 11 biases the lift bracket 25 into contact with the bolt 62. Therefor for a given position of the bolt 62 there will be a certain set angular relationship Z between the axis of the control handle 40 and the longitudinal axis of the lift bracket 25 (FIGS. 1 and 5C). If the length of the bolt 62 between the flange 65 of the adjustment bracket 61 and the underside of the lift bracket 25 is increased the angle Z will decrease (FIGS. 5A, 5B). If the same length of the bolt 62 is reduced, the angle Z will increase (FIG. 5D). After adjustment, the length of the bolt 62 is fixed by tightening of both of the locking nuts 63, 64.

The variation of the length of the bolt 62 modifies the orientation of the mower deck 11 (for purposes later explained). As shown in FIG. 2, the lift bracket 25 associated with the adjustment mechanism 60 is one of a pair of rearward lift brackets 25, each of which is connected to an independent front lift bracket 24. By adjusting the angular relationship between one of the rear lift brackets 25 and the control lever 40, one alters the distance between the mower deck 11 and the ground on that side of the deck 11 for a given set position of the control handle 40. This adjustment allows one to even up the distances between the mower deck 11 and the ground between the two sides of the mower deck 11. This produces an even cut for the lawn mower (the cutting blades rotate sufficiently fast that any fore/aft or angular unevenness is normally not objectionable; the deck 11 produces a cut height equal to the lowest section of the blades, sections that can be balanced by the adjustment mechanism of the invention).

Note that by the addition of a way of effectively adjusting the length of any of the connecting links 33, 35 or 26, one could compensate for any fore and aft or diagonal misalignment of the deck. An example would be a turnbuckle in the connecting rod 35 or an additional adjustment mechanism on a front lift link 24 (with the rod 35 connected to the upper extending portion of the bracket 61 instead of the link 24). Also with two adjustment mechanisms 60, one for each lift link 25, one could also adjust the height of the mower deck 11 to match a given position of the control lever 40, thus providing an accurate method of producing an exact known height cut—i.e. adjusting the first notch of a control lever 40 stop mechanism to equal a 1" height. This would enable an operator to know precisely the length of the cut grass without guesswork or measuring. With the knowledge that the lowest cutting position was a fixed length (example 1") and each notch was an additional fixed length (example ½"), even a novice could produce a finished lawn having a exact length without a single measurement.

Therefor, although the invention has been described in its preferred form with a certain degree of particularity, it is to be understood that numerous changes and modifications may be made without departing from the invention as hereinafter claimed.

What is claimed is:

1. In an mower deck height control having a deck suspended from two longitudinally spaced pairs of laterally spaced lift brackets, one pair of the laterally spaced lift brackets connected to a rotary control shaft for rotation therewith and the other pair of the laterally spaced lift brackets being connected to the first pair for rotation therewith, an improved height adjustment mechanism comprising bearing means between one of the first pair of lift brackets and the rotary shaft to rotatively connect said one lift bracket to the rotary shaft, an adjustment bracket, said adjustment bracket having a body and a flange, means to fixedly connect said body of said adjustment bracket to the rotary control shaft with said flange radially in line with part of said one lift bracket, said flange having a hole, an adjustment bolt, said adjustment bolt having a head, said adjustment bolt being in said hole in said flange with said head in separable lost motion contact with said part of said one lift bracket, means to connect said adjustment bolt to said flange such that the rotation of said adjustment bolt alters the distance that said head is from said flange such that the selective rotation of said adjustment bolt adjusts the angular relationship between said one lift bracket and the rotary control shaft with said angular adjustment modifying the relative lateral angle of the mower deck, bearing means between the other of the first pair of lift brackets and the rotary shaft to rotatively connect said other lift bracket to the rotary shaft, a subsidiary bracket said subsidiary bracket having a body and a tab, means to fixedly connect said body of said subsidiary bracket to the rotary control shaft with said tab radially in line with part of said other lift bracket, said tab being in separable lost motion contact with said part of said other lift bracket, and the separable lost motion contact of said head of said adjustment bolt to said one lift bracket and said tab to said other lift bracket allowing the mower deck to float upwards against the weight of the deck from height set by the mower deck height control.

2. The improved mower deck height control of claim 1 characterized by the addition of a lift handle, and said lift handle selectively rotating the rotary control shaft.

3. The improved height control of claim 1 wherein there are links between the two pairs of laterally spaced lift brackets and the mower deck and between the one and other pair of laterally spaced lift brackets, the links each having a length and characterized by the addition of an adjustment mechanism and said adjustment mechanism being in one of links to selectively modify the length thereof to compensate for any fore and aft or diagonal misalignment of the deck.

* * * * *